(12) United States Patent
Furuskog et al.

(10) Patent No.: US 10,341,005 B2
(45) Date of Patent: Jul. 2, 2019

(54) NETWORK NODE, A WIRELESS DEVICE, AND METHODS THEREIN FOR BEAM SELECTION

(71) Applicant: Telefonaktiebolaget LM Ericsson (publ), Stockholm (SE)

(72) Inventors: Johan Furuskog, Stockholm (SE); Håkan Andersson, Linköping (SE); Mattias Frenne, Uppsala (SE); Johan Kåredal, Lund (SE); John Skördeman, Brokind (SE); Tomas Sundin, Sollentuna (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/570,880

(22) PCT Filed: Jun. 29, 2017

(86) PCT No.: PCT/SE2017/050727
§ 371 (c)(1),
(2) Date: Oct. 31, 2017

(87) PCT Pub. No.: WO2019/004887
PCT Pub. Date: Jan. 3, 2019

(65) Prior Publication Data
US 2019/0007122 A1    Jan. 3, 2019

(51) Int. Cl.
*H04L 5/12* (2006.01)
*H04B 7/06* (2006.01)
(Continued)

(52) U.S. Cl.
CPC ......... *H04B 7/0695* (2013.01); *H04L 5/0048* (2013.01); *H04W 36/0016* (2013.01); *H04W 36/305* (2018.08); *H04W 36/18* (2013.01)

(58) Field of Classification Search
CPC ............... H04B 7/0695; H04L 5/0048; H04W 36/0016; H04W 36/305; H04W 36/18
(Continued)

(56) References Cited

U.S. PATENT DOCUMENTS 10,085,184 B2 * 9/2018 Liu .................. H04W 36/0083
2013/0155847 A1    6/2013 Li et al.
(Continued)

*Primary Examiner* — Dhaval V Patel
(74) *Attorney, Agent, or Firm* — Murphy, Bilak & Homiller, PLLC

(57) ABSTRACT

A Network Node (NN) 208 and a method therein for beam selection. When an upcoming ability to serve a Wireless Device (WD) 210 using a current NN beam is predicted to be lost based on historic data, the NN selects an upcoming NN beam out of one or more candidate NN beams that are able to serve the WD when the NN has lost ability to serve the WD using the current NN beam. The NN configures a dedicated Beam Reference Signal (BRS) for the upcoming NN beam, which is to be detected in beam selection by the WD when the NN loses ability to serve the wireless device using the current NN beam. By means of the current NN beam, the NN transmits, to the WD, a configuration of the dedicated BRS. Further, by means of the upcoming NN beam, the NN transmits, to the WD, the dedicated BRS.

25 Claims, 7 Drawing Sheets

(51) Int. Cl.
*H04W 36/30* (2009.01)
*H04W 36/00* (2009.01)
*H04L 5/00* (2006.01)
*H04W 36/18* (2009.01)

(58) Field of Classification Search
USPC ........ 375/260, 262, 267, 295, 316; 370/203, 370/204, 208, 209
See application file for complete search history.

(56) References Cited

U.S. PATENT DOCUMENTS

2015/0230263 A1 8/2015 Roy et al.
2016/0337916 A1* 11/2016 Deenoo .................. H04W 8/22
2018/0034531 A1* 2/2018 Sadiq .................. H04B 7/0408

* cited by examiner

Figure 4 Method performed by network node 208

Figure 6 Method performed by wireless device 210

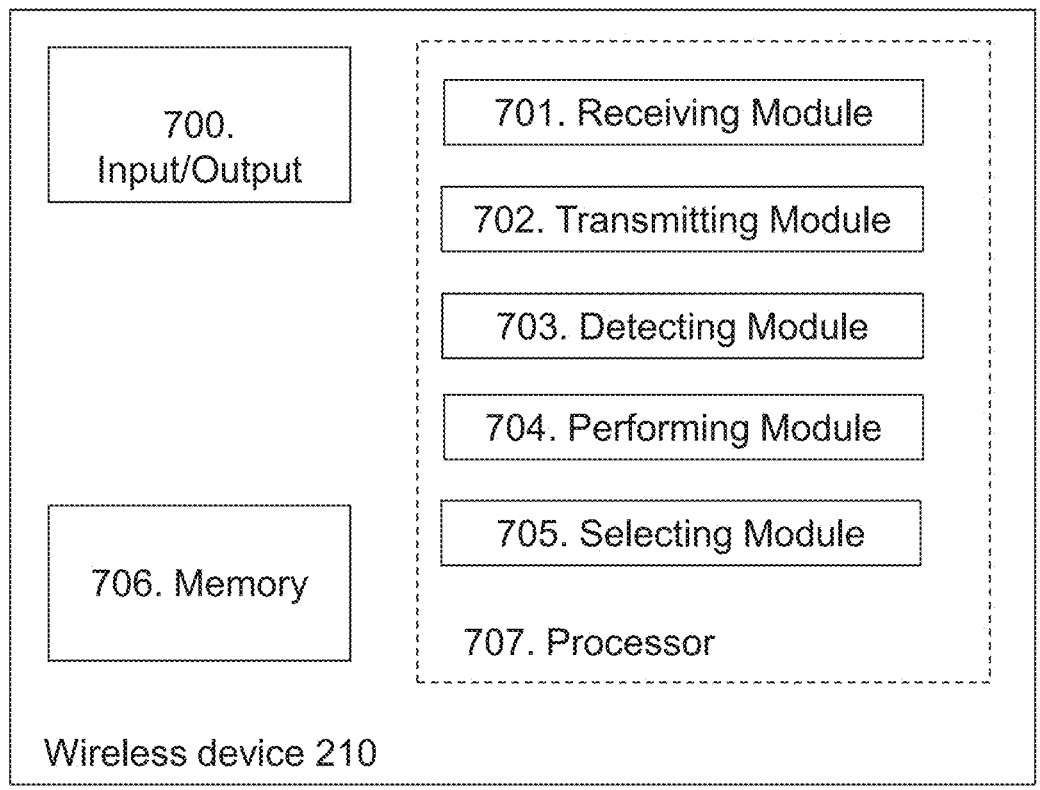
Figure 7
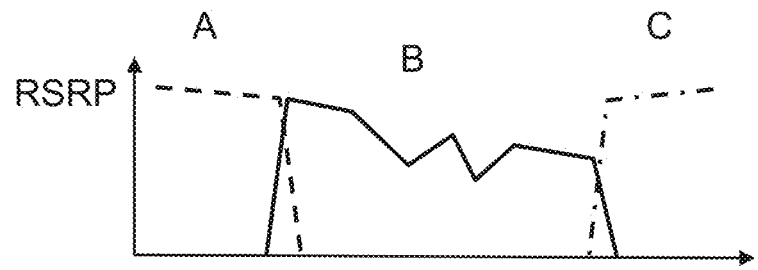
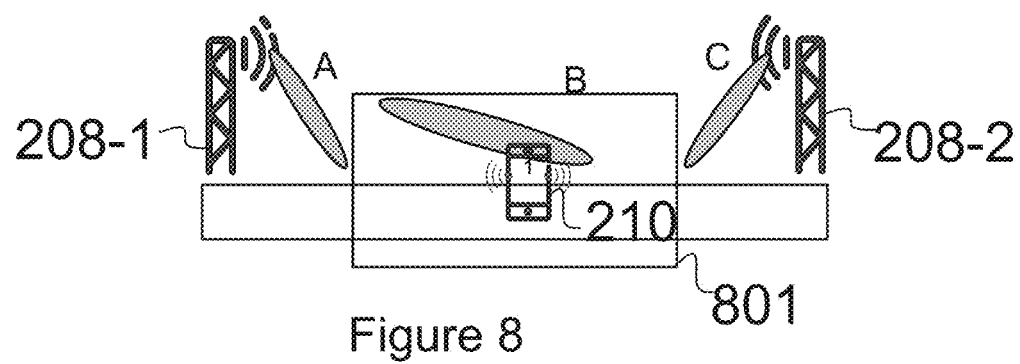
Figure 8

NETWORK NODE, A WIRELESS DEVICE, AND METHODS THEREIN FOR BEAM SELECTION

TECHNICAL FIELD

Embodiments herein relate generally to a Network Node (NN), a wireless device and to methods therein. In particular, embodiments relate to beam selection.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", a "NodeB", a "B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code-division multiple access (WCDMA) and/or High-Speed Packet Access (HSPA) for user equipment. In a forum known as the Third Generation Partnership Project (3GPP), telecommunications suppliers propose and agree upon standards for third and higher generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Beamforming will be an important technology in future radio communication systems since it may improve performance. The performance may be improved both by increasing the received signal strength, thereby improving the coverage, and by reducing unwanted interference, thereby improving the capacity. Beamforming may be applied both in a transmitter and a receiver. In a transmitter, beamforming amounts to configuring the transmitter to transmit the signal in a specific direction or in a few directions, and not in other directions. In a receiver, beamforming amounts to configuring the receiver to only receive signals from a certain direction or from a few directions, and not from other directions. When beamforming is applied in both the transmitter and the receiver for a given communication link, we refer to the link as a Beam Pair Link (BPL) comprising a combination of beams selected in the both ends. A BPL may also be referred to as a Beam-Tracking Process (BTP) since it may be subject to different procedures for its maintenance. Generally, the beamforming gains are related to the widths of the used beams. For example, a relatively narrow beam provides more gain than a wider beam.

FIG. 1 is a combined flowchart and signalling scheme schematically illustrating a normal BPL setup according to prior art. As shown in FIG. 1, a UE transmits a detected Beam Reference Signal (BRS) report to the network (NW), e.g. to a network node. The report comprises information relating to newly detected network beams based on received reference signals from the NW. The NW instructs the UE to start searching for suitable UE beams, to set up a BPL (referred to as tracking process set up in FIG. 1), and to report a tracking set up completion back to the NW. The NW starts sending dedicated BRS or continues to send BRS.

For a more general description of beamforming, one typically talks about "beamforming weights" rather than "beams". On the transmission side, the beamforming weights are the complex constants that the signal to be transmitted are multiplied with before being distributed to the individual antenna elements. There is a separate beamforming weight for each antenna element, which allows maximum freedom in shaping the transmission beam given the fixed antenna array. Correspondingly, on the receiving side, the received signal from each antenna element is multiplied separately with the beamforming weights before the signals are combined. However, in the context of the present text, the description is easier to follow if the somewhat simplified notion of beams, pointing in certain physical directions, is adopted.

Beamforming requires some form of beam management, such as beam search, beam refinement, and/or beam tracking, to determine what transmit and receive beams, e.g. directions, to use for communication between a transmitter and a receiver. Beam search may involve the transmitter sweeping a signal across several beams, to allow a receiver in an unknown direction to receive the signal. Beam search may also involve the receiver scanning across several receive beams, thereby being able to receive a signal from an initially unknown direction. Beam search typically also involves the receiver sending a message to a transmitter to indicate which transmit beam or beams are best suited for transmission to that receiver.

Beam refinement and/or tracking is applied when a working beam or a beam pair is already selected. Beam refinement is to improve an already selected beam, for instance changing its beamforming weights such that a narrower beam that provides a better gain is obtained. Beam tracking is to update the selected beams, i.e., to replace the Tx- or Rx-beam in an existing BPL when the conditions change, e.g., due to mobility. Beam refinement and tracking are typically performed by temporarily evaluating a different beam than the one that is currently used for communication, and switching to that beam if it is deemed better than the current.

Beam search may take considerable time, if there are many beams to search for on both the transmitter and receiver side, and during this time communication is typically not possible. Beam refinement and tracking, on the other hand, are usually ongoing activities that cause little or no disturbance to ongoing communication.

Communications networks, e.g. by means of a network node, may transmit periodic or continuous reference signals that are semi-statically configured to support mobility and beam management, e.g. by sweeping across several transmit beams as described above. Such transmissions are here referred to as Beam Reference Signals (BRS) or Mobility Reference Signal (MRS). It is here envisioned that some aspects of beam management may then be performed by a terminal with little or no explicit involvement from the network, if the terminal may assume that the network is transmitting the BRS periodically or continuously. For instance, in some candidate realizations of 5G, terminals perform beam search as part of the system-acquisition procedure, resulting in the selection of a terminal beam such that by using this beam the terminal is able to sufficiently well receive BRS transmitted on a certain network beam. Then the terminal performs a random-access transmission using its selected terminal beam using a transmission resource, e.g. a time and/or a frequency resource, where it expects the network to be able to receive random-access transmissions using that certain network beam. Terminals may continue to receive BRS even when communication is ongoing, to search for new communication paths and to perform refinement and tracking of currently used beams.

Many radio communication systems include some kind of radio-link supervision, whereby the quality of the communication is regularly evaluated, and some action is taken in case the quality is unacceptable or the communication is lost. Radio-link supervision often involves a receiver checking the presence and/or evaluating the quality of a sync signal or a reference signal. It can also involve monitoring the number of retransmissions in a retransmission protocol, and monitoring the time it takes to receive a response to an earlier transmitted request message. In case any of these evaluations indicate a severe problem, the terminal often declares a radio-link failure and initiates some action. In case of a network node having lost communication with a terminal, the action can involve releasing some or all network resources related to that terminal. In case of a terminal having lost communication with a network, the action may involve searching for sync and reference signals from the network and, in case such signals are found, attempting to access the network again. In a beamforming system, this typically involves beam search.

In addition, communications networks schedule and transmit terminal-specific reference signals that, among other things, can be used for beam searching, beam tracking, and beam refinement. Such signals are here referred to as dedicated Beam Reference Signals (BRS) or Beam-Refinement Reference Signals (BRRS). Another example of a terminal-specific reference signal is the Channel-State Information Reference Signal (CSI-RS). This is a reference signal scheduled by the network for one (or possibly, several) specific terminal (or terminals) with the intention of providing measurement opportunities in the terminal such that more detailed channel knowledge may be obtained and reported back to the network.

Finally, communications networks schedule reference signals transmitted in the UL that, among other things, also may be used for beam searching, beam tracking, and beam refinement. Such signals are here referred to as Sounding Reference Signals (SRS).

To sustain a transmission link between the communications network, e.g. the network node, and the terminal over time-varying conditions (e.g. due to mobility) terminals typically consider several possible BPLs for which the beams are tracked and refined. Such BPLs that are identified jointly by the network and the terminal are here referred to as monitored BPLs.

Out of the monitored BPLs, the communications network and terminal agree to use at least one BPL for data and control channel reception and transmission, herein referred to as an active BPL. Depending on its capabilities, a terminal may support one or more active BPL. Whether two BPLs may be simultaneously active or not depends on the terminal implementation. If the terminal-side (UE) beams associated with two BPL are realized using the same processing components such as antenna panels, analog and/or digital circuitry, software units, etc., the UE may not be able to transmit and receive using those UE beams simultaneously. If that is the case, the BPLs are regarded as incompatible. Whether BPLs are compatible or not has to be known by the communications network, since it typically selects which BPLs to be active or monitored. This is solved during the initialization of the BPL based on a compatibility indication from the UE to the network.

Tracking a BPL implies beam tracking and/or beam refinement at the communications network as well as the terminal. To track a BPL (active or monitored) there must be some transmissions on which to measure and evaluate the link quality. In DL, the more persistent BRS may enable tracking of the DL Tx-beam and, more slowly, of the DL Rx-beam. For faster DL Rx-beam tracking scheduled BRRS may be used. In the event of DL/UL reciprocity, the BRS may be sufficient to track a BPL and no UL transmissions are thus needed.

As described above, before being able to use a new BPL a number of procedures are required such as beam search, detection and signaling to the communications network, configuring of BPL, beam refinement, and/or beam tracking to determine what transmit and receive beams (directions) to use. This may take considerable time.

In scenarios where the radio environment changes fast, and the signal from a used BPL is quickly degraded, there might be too little time to detect and configure a new BPL, in which case there is a risk of losing the connection and thereby also a risk of losing an ongoing communication, e.g. an ongoing call.

According to developments of wireless communications networks an improved beam selection is needed for improving the performance of the wireless communications network.

SUMMARY

An object of embodiments herein is to address at least some drawbacks with the prior art and to improve the performance in a communications network.

According to one aspect of embodiments herein, the object is achieved by a method performed by a network node for beam selection. The network node and a wireless device are operating in a wireless communications network and the wireless device is served by the network node using a current network node beam.

When an upcoming ability to serve the wireless device using the current network node beam is predicted to be lost based on historic data relating to at least one signal quality of one or more candidate network node beams at one or more positions located within coverage of the wireless communications network and relating to one or more movement patterns of one or more wireless devices operating within coverage of the wireless communications network, the network node selects an upcoming network node beam out of the one or more candidate network node beams that are able to serve the wireless device when the network node has lost ability to serve the wireless device using the current network node beam.

Further, the network node configures a dedicated beam reference signal for the upcoming network node beam, which upcoming network node beam is to be detected in beam selection by the wireless device when the network node loses ability to serve the wireless device using the current network node beam.

By means of the current network node beam, the network node transmits, to the wireless device, a configuration of the dedicated beam reference signal.

By means of the upcoming network node beam, the network node transmits, to the wireless device, the dedicated beam reference signal.

According to another aspect of embodiments herein, the object is achieved by a network node for beam selection. The network node and a wireless device are configured to operate in a wireless communications network and the wireless device is configured to be served by the network node using a current network node beam.

The network node is configured to select an upcoming network node beam out of one or more candidate network node beams when an upcoming ability to serve the wireless device using the current network node beam is predicted to be lost based on historic data relating to at least one signal quality of the one or more candidate network node beams at one or more positions located within coverage of the wireless communications network and relating to one or more movement patterns of one or more wireless devices operating within coverage of the wireless communications network. The one or more candidate network node beams are able to serve the wireless device when the network node has lost ability to serve the wireless device using the current network node beam.

Further, the network node is configured to configure a dedicated beam reference signal for the upcoming network node beam, which upcoming network node beam is to be detected in beam selection by the wireless device when the network node loses ability to serve the wireless device using the current network node beam.

The network node is configured to transmit, by means of the current network node beam, a configuration of the dedicated beam reference signal to the wireless device.

The network node is configured to transmit, by means of the upcoming network node beam, the dedicated beam reference signal to the wireless device.

According to another aspect of embodiments herein, the object is achieved by a method performed by a wireless device for beam selection. The wireless device and a network node are operating in a wireless communications network and the wireless device is served by the network node using a current network node beam.

By means of the current network node beam, the wireless device receives, from the network node, a configuration of a dedicated beam reference signal.

By means of an upcoming network node beam, the wireless device detects the dedicated beam reference signal. The upcoming network node beam is one network node beam out of one or more candidate network node beams that are able to serve the wireless device when the network node has lost ability to serve the wireless device using the current network node beam.

The wireless device selects an upcoming wireless device beam based on a measurement of a signal quality of the received dedicated beam reference signal.

Further, the wireless device transmits, to the network node, information about the selected upcoming wireless device beam.

According to another aspect of embodiments herein, the object is achieved by a wireless device for beam selection. The wireless device and a network node are configured to operate in a wireless communications network and the wireless device is configured to be served by the network node using a current network node beam.

The wireless device is configured to receive, by means of the current network node beam, a configuration of a dedicated beam reference signal from the network node.

The wireless device is configured to detect, by means an upcoming network node beam, the dedicated beam reference signal. The upcoming network node beam is one network node beam out of one or more candidate network node beams that are able to serve the wireless device when the network node has lost ability to serve the wireless device using the current network node beam.

Further, the wireless device is configured to select an upcoming wireless device beam based on a measurement of a signal quality of the received dedicated beam reference signal.

Furthermore, the wireless device is configured to transmit, to the network node, information about the selected upcoming wireless device beam.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a carrier comprising the computer program, wherein the carrier is one of an electronic signal, an optical signal, a radio signal or a computer readable storage medium.

Since the network node selects the upcoming network node beam when an upcoming ability to serve the wireless device on the current network node beam is predicted to be lost based on historic data and since the network node transmits, by means of the upcoming network node beam, the dedicated beam reference signal to the wireless device, the wireless device is able to select the upcoming wireless device beam based on a measurement of a signal quality of the received dedicated beam reference signal before the current network node beam is predicted to be lost, whereby an improved beam selection is provided. This results in an improved performance in the communications network.

Thus, an advantage with embodiments herein is that in scenarios with fast changing radio environment, the configuration of what to measure on in order to establish a potential new BPL, or the speculative establishment of a new BPL, is done just before the upcoming network node beam is detected by the wireless device and therefore the time before the traffic may be sent on the new connection is shorten and by that the risk for a lost connection is reduced.

Another advantage with embodiments herein is that they enable the network, e.g. by means of the network node, to configure measurements of dedicated BRS on a reduced number of network node beams, thus reducing the measurement and processing requirements of the wireless device as well as the time required to complete and report the measurements.

BRIEF DESCRIPTION OF DRAWINGS

Examples of embodiments herein are described in more detail with reference to attached drawings in which:

FIG. 7 is a block diagram schematically illustrating embodiments of a wireless device; and FIG. 8 schematically illustrates an example radio environment outside and inside a tunnel.

DETAILED DESCRIPTION

In scenarios wherein a wireless communications network, e.g. a network node, has learnt that the number of alternatives for an upcoming network node beam are limited to one beam or a few beams, the network node may foresee and assist a wireless device in the choice of one or more new good candidate network beam(s), and by doing so shorten the delay before the traffic may be sent on the new connection.

Examples of such scenarios may be when the wireless device is traveling through a tunnel or making a sharp turn in a dense city.

According to developments of wireless communications networks an improved beam selection is needed for improving the performance of the wireless communications network.

An object of embodiments herein is therefore how to provide an improved performance in a wireless communications network.

For example, with machine-learning techniques the wireless communications network, e.g. the network node, may in some scenarios foresee an upcoming network node beam before it is detected by the wireless device. Some embodiments disclosed herein use that knowledge and preconfigure a BPL, instruct the wireless device to restart wireless device beam tracking and schedule dedicated beam reference signals. This will speed up beam switch and in scenarios where beam quality changes fast, reduce dropped calls.

Note that although terminology from 3GPP LTE is used in this disclosure to exemplify the embodiments herein, this should not be seen as limiting the scope of the embodiments herein to only the aforementioned system. Other wireless systems, such as for example 5G, Wideband Code-Division Multiple Access (WCDMA), Worldwide Interoperability for Microwave Access (WiMax), Ultra-Mobile Broadband (UMB) and GSM, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments. Further, the description frequently refers to wireless transmissions in the downlink, but embodiments herein are equally applicable in the uplink.

Figure 1:
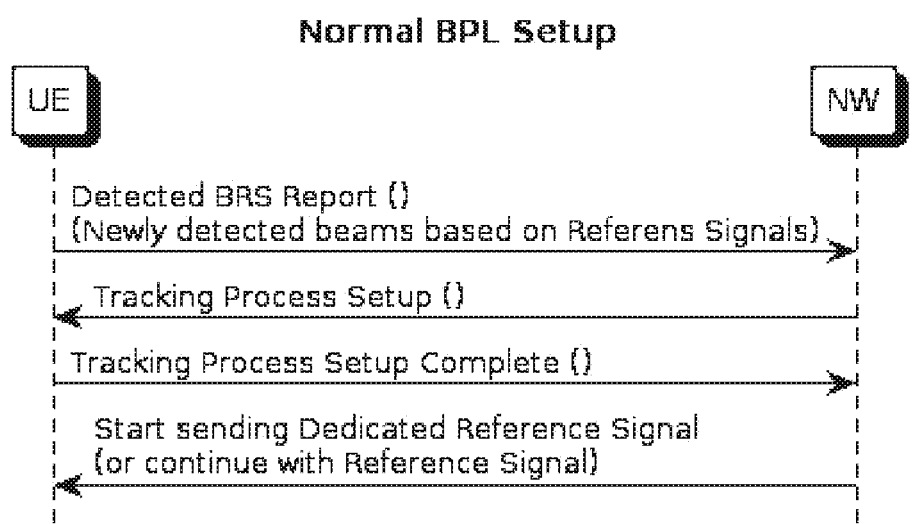
FIG. 1 is a combined flowchart and signalling scheme schematically illustrating a normal BPL setup according to prior art.
Figure 2:
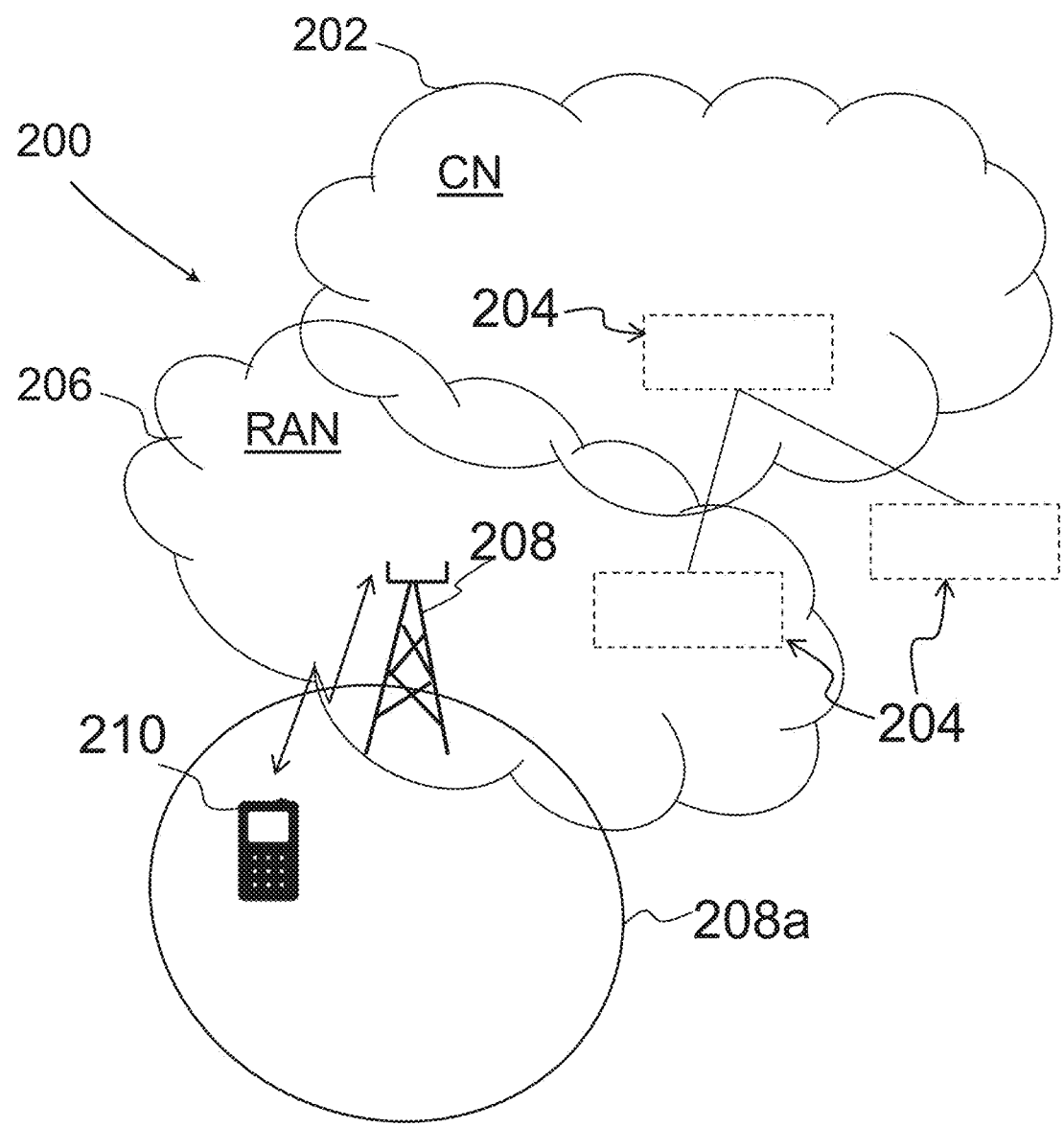
FIG. 2 schematically illustrates embodiments of a wireless communications network.

FIG. 2 depicts an example of the wireless communications network 200 in which embodiments herein may be implemented. The wireless communications network 200 is a wireless communication network such as a New radio (NR) network, a 5G network, a GSM EDGE Radio Access Network (GERAN) network, an LTE network, a WCDMA network, a GSM network, any 3GPP cellular network, a WiMAX network, or any wireless or cellular network/system.

A core network 202 is comprised in the wireless communications network 200. The core network 202 is a wireless core network such as a NR core network, a 5G core network, GERAN core network, an LTE core network, e.g. an Evolved Packet Core (EPC); a WCDMA core network; a GSM core network; any 3GPP core network; WiMAX core network; or any wireless or cellular core network.

A core network node 204 may operate in the core network 202. The core network node 204 may be an Evolved Serving Mobile Location Centre (E-SMLC), a Mobile Switching Centre (MSC), a Mobility-Management Entity (MME), an Operation and Maintenance (O&M) node, a Serving Gate-Way (S-GW), a Serving General Packet-Radio Service (GPRS) Node (SGSN), etc.

A Radio Access Network (RAN) 206 is comprised in the wireless communications network 200. The wireless communications network 206 is a wireless communications network such as a NR access network, a 5G access network, a GERAN access network, an LTE access network, e.g. an Evolved UMTS Terrestrial Radio Access Network (E-UTRAN); a WCDMA access network; a GSM access network; any 3GPP access network; WiMAX access network; or any wireless or cellular access network.

It should be understood that in some embodiments the core network 202 and the RAN 206 are combined into one single network or that the RAN 206 may comprise the core network 202.

A Radio Network Node (RNN) 208 serving a geographical area, e.g. a cell 208a such as a serving cell may be operating in the wireless communications network 200. It should be understood that more than one RNN may be operating in the wireless communications network 200 and that one RNN may be configured to serve several geographical areas, e.g. cells. The RNN 208 may be said to operate in the wireless communications network 200.

The RNN 208 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the access point depending e.g. on the first radio access technology and terminology used. The RNN 208 may be referred to as a serving radio network node and communicates with a wireless device with Downlink (DL) transmissions to the wireless device and Uplink (UL) transmissions from the wireless device. Other examples of the RNN 208 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS), etc.

The RNN 208 may be configured for wireless communication with one or more wireless devices, such as a wireless device 210, when the wireless device is located within the geographical area, e.g. the cell 208a, served by the RNN 208. Herein, this is also specified as the RNN 208 manages or is configured to manage communication with one or more wireless devices in the respective geographical area. In this disclosure, the respective geographical area is sometimes referred to as a respective coverage area, cluster or cell. Further, when the wireless device is located within the geographical area and served by the RNN serving the geographical area, that geographical area may be referred to as a serving geographical area, e.g. a serving cell. Thus, when the wireless device 210 is located within the geographical area and is served by the RNN 208, the geographical area is sometimes herein referred to as the serving cell.

In this disclosure the term "network node 208" is sometimes used to refer to the RNN 208. Thus, the terms network node 208 and RNN 208 may be used interchangeably.

Further, it should be understood that a plurality of RNNs 208 may be operating in the wireless communications network 200. Thus, embodiments disclosed herein are also configured to handle multi-cell and/or many RNNs. This may be done by communication between the RNNs or by involving a coordination node.

In the wireless communication network 200, wireless devices e.g. the wireless device 210 such as a mobile station, a non-Access Point (non-AP) STA, a STA, a user equipment (UE) and/or a wireless terminals, communicate via one or more Access Networks (AN), e.g. RAN, to one or more Core Networks (CN). Thus, the wireless device 210 is operating in the wireless communications network 200.

It should be understood by the skilled in the art that "wireless device" is a non-limiting term which means any terminal, communications device, wireless communication terminal, user equipment, Machine-Type Communication (MTC) device, Device-to-Device (D2D) terminal, or node e.g. smart phone, laptop, mobile phone, sensor, relay, mobile tablets, an Internet-of-Things (IoT) device, e.g. a Cellular IoT (CIoT) device or even a small base station communicating within a service area.

In this disclosure the terms communications device, terminal, wireless device and UE are used interchangeably. Please note the term user equipment used in this document also covers other wireless devices such as Machine-to-Machine (M2M) devices, even though they do not have any user.

Figure 3:
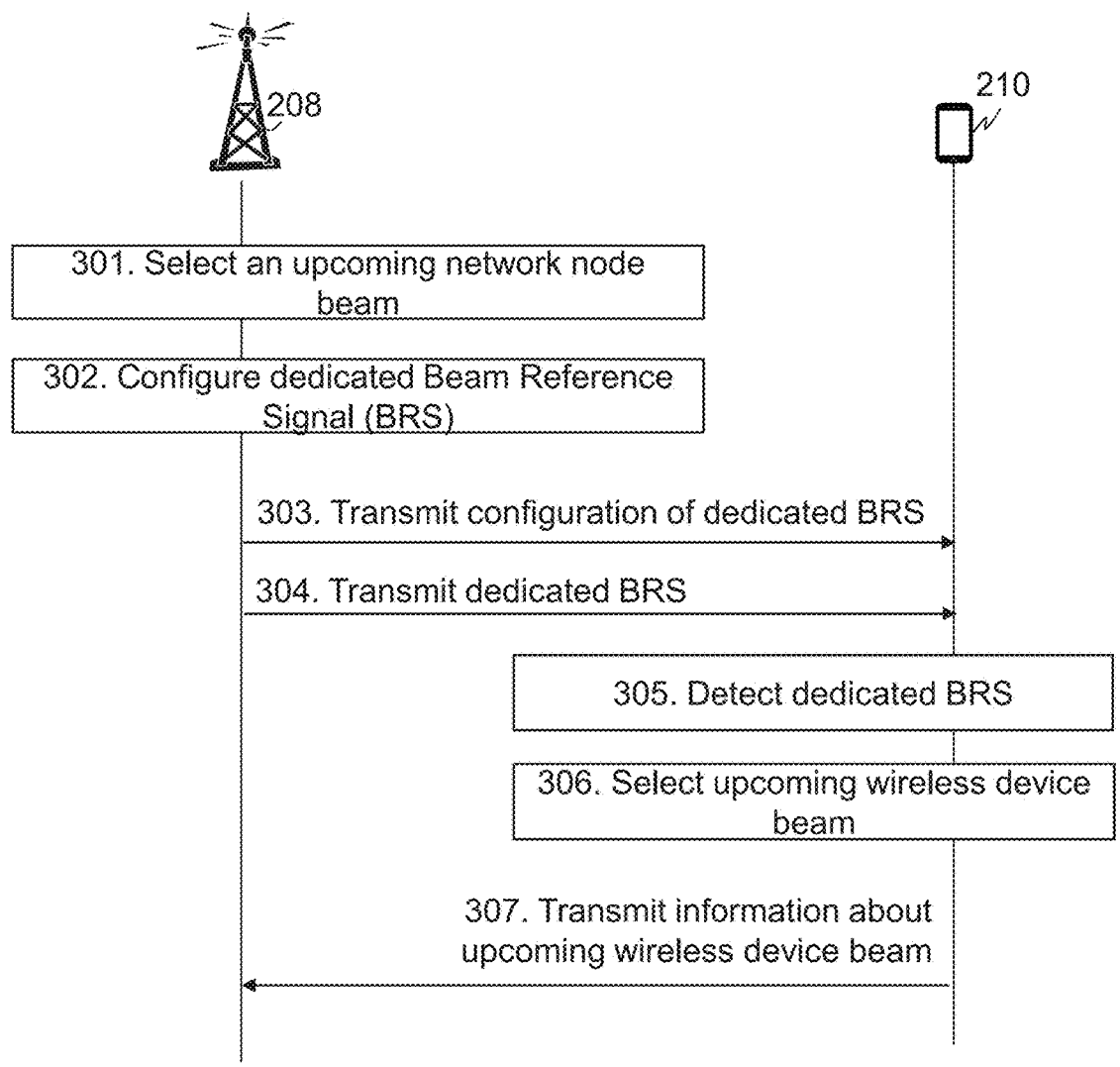
FIG. 3 is a combined flowchart and signalling scheme for beam selection according to some embodiments.

FIG. 3 is a combined flowchart and signalling scheme for beam selection according to embodiments herein. The network node 208 and the wireless device 210 are operating in the wireless communications network 200. Further, the wireless device 210 is served by the network node 208 using a current network node beam, e.g. using a current beam for the network node. As previously mentioned, the network node 208 may also be referred to as the RNN 208.

Action 301

The network node 208 selects an upcoming network node beam based on historic data. Thus, in order to predict an upcoming network node to be used at a future point in time, the network node 208 uses historic data. The historic data may relate to at least one signal quality, e.g. a Reference Signal Received Power (RSRP), of one or more candidate network node beams at one or more positions located within coverage of the wireless communications network 200 and relating to one or more movement patterns of one or more wireless devices operating within coverage of the wireless communications network 200. Thus, based on historic values of the at least one signal quality for the one or more candidate network beams at the one or more positions and based on historic movement patterns of the one or more wireless devices, the network node 208 selects the upcoming network beam. It should be understood that by the term "historic" is meant to refer to data or actions occurring at a point in time preceding the current point in time.

Further, when an upcoming ability to serve the wireless device 210 using the current network node beam is predicted to be lost based on historic data, the network node 208 selects the upcoming network node beam out of one or more candidate network node beams that are able to serve the wireless device 210 when the network node 208 has lost ability to serve the wireless device 210 using the current network node beam. In other words, based on the historic data the network node 208 determines an upcoming beam that it will use in the future when the network node 208 is to lose or has lost the ability to serve the wireless device 210 using the current network beam. Thus, by the term "upcoming beam" when used in this disclosure is meant a beam to be used at a future point in time, e.g. at a point in time succeeding the current point in time. It should be understood that the number of upcoming beams may be more than one. For example, a network node capable of dual connectivity may select two upcoming network beams. However, it should be understood that dual connectivity is not a requirement for selecting two network beams. A transmission on multiple layers may use several beams (corresponding to multi-path propagation) but the wireless device 210 may still be only "singly connected" to one network node 208.

By the term "candidate network beam" when used herein is meant a network beam that is a candidate for being the upcoming network beam. Thus, the candidate network beam is a possible upcoming network beam. Only network beams that are able to serve the wireless device 210 when the network node 208 has lost ability to serve the wireless device 210 using the current network node beam may belong to the group of candidate network beams.

The one or more candidate network node beams may be comprised in a subset of a total number of network node beams. For example, the subset may comprise one to ten candidate network beams, preferably one to six candidate network beams. Further, the total number of network beams may be a total number of network beams provided by the entire wireless communications network or by the network node 208.

By the expressions "lost ability to serve" and "is to lose ability to serve" when used in this description are meant that a quality value of the current network beam has passed or is to pass a threshold, e.g. is below the threshold. For example, the quality value may be an RSRP value.

The historic data may be collected by the wireless communications network 200, e.g. by means of the network node 208, and stored in a memory or database comprised in the communications network 200 or connected to the communications network 200. For example, the communications network 200 may over time, e.g. by means of machine-learning techniques, build up knowledge of one or more out of: between which network beams the wireless devices, e.g. the wireless device 210, typically move; the direction of travel of a wireless device by knowing in what sequence the network beams were used, processing components, such as antenna panels, of the network node 208; the processing components, such as antenna panels, of the wireless device 210, that was used in a BPL with a certain network beam; positions of wireless devices by recording the measurements of signal strengths. For example, the signal strength may be measured on downlink reference signals and reported by the wireless device or may be measured on uplink reference signals, e.g. UL DMRS or SRS, measured in the network.

The communications network 200 may collect the historic data by receiving, from all wireless devices operating in the communications network 200, signal quality values, e.g. RSRP values, measured on network node beams.

Action 302

The network node 208 configures a dedicated BRS. The dedicated BRS is a specific BRS for the wireless device 210, and when received by the wireless device 210 it will assist the wireless device 210 to select an upcoming wireless device beam. This will be described in more detail below.

Especially, the network node 208 configures the dedicated BRS for the upcoming network node beam, which upcoming network node beam is to be detected in beam selection by the wireless device 210 when the network node 208 loses ability to serve the wireless device 210 using the current network node beam.

It should be understood that even if this disclosure refers to one dedicated BRS several dedicated BRSs may be configured, and thus the disclosure is equally applicable to a plurality of dedicated BRSs.

Action 303

The network node 208 transmits configuration of the dedicated BRS to the wireless device 210. Especially, the network node 208 transmits, by means of the current network node beam, a configuration of the dedicated beam reference signal to the wireless device 210.

Thereby, the wireless device 210 will receive knowledge about the dedicated BRS to be transmitted to the wireless device 210 in action 304 below. Thus, the wireless device 210 will be informed about the dedicated BRS it soon will be able to receive and detect. Since the dedicated BRS will be transmitted using the upcoming network beam, the wireless device 210 will also be informed about the upcoming network beam to be used for the transmission. In some embodiments, the reception of the configuration of the dedicated BRS triggers the wireless device 210 to perform beam selection, e.g. triggers the wireless device 210 to start searching for an upcoming wireless device beam to be used in communication with the network node 208.

Action 304

The network node 208 transmits the dedicated BRS to the wireless device 210. Especially, the network node 208 transmits, by means of the upcoming network node beam, the dedicated BRS to the wireless device 210.

This may be done in order to inform the wireless device 210 to start wireless device beam detection based on the received dedicated BRS, cf. Action 305 below. In other words, reception of the dedicated BRS may trigger the wireless device 210 to start searching for an upcoming wireless device beam to be used in the communication with the network node 208.

Action 305

The wireless device 210 detects the dedicated BRS transmitted from the network node 208. This may trigger the wireless device 210 to perform the wireless device beam search.

Action 306

The wireless device 210 selects an upcoming wireless device beam. Based on the wireless device beam search the upcoming wireless device beam is selected. For example, the wireless device 210 may measure the received signal quality of all configured dedicated BRS, i.e., all upcoming network beams, using all or a subset of all possible wireless device beams. The wireless device beam(s), and corresponding network beam(s), providing the best signal quality are then selected.

Action 307

The wireless device 210 transmits information about the upcoming wireless device beam(s) and the corresponding network beam(s) to the network node 208. Thereby, the network node 208 will receive knowledge about the upcoming wireless device beam and corresponding network beam(s) and may set up a BPL comprising the upcoming network node beam and the upcoming wireless device beam. The BPL may be set up by registering in the network, e.g. in the network node 208, that this (these) network beam(s) and reported wireless device beam information together constitute a BPL. Note that the actual wireless device beams are not reported but only information about which logical resources are utilized. This enables the network, e.g. the network node 208, to deduce if two BPLs would be incompatible, and thus, cannot be configured simultaneously. This also enables the wireless device 210 to autonomously update which receive antenna panels it uses if, e.g. the wireless device is rotated, as long as the different logical resources remain compatible.

Figure 4:
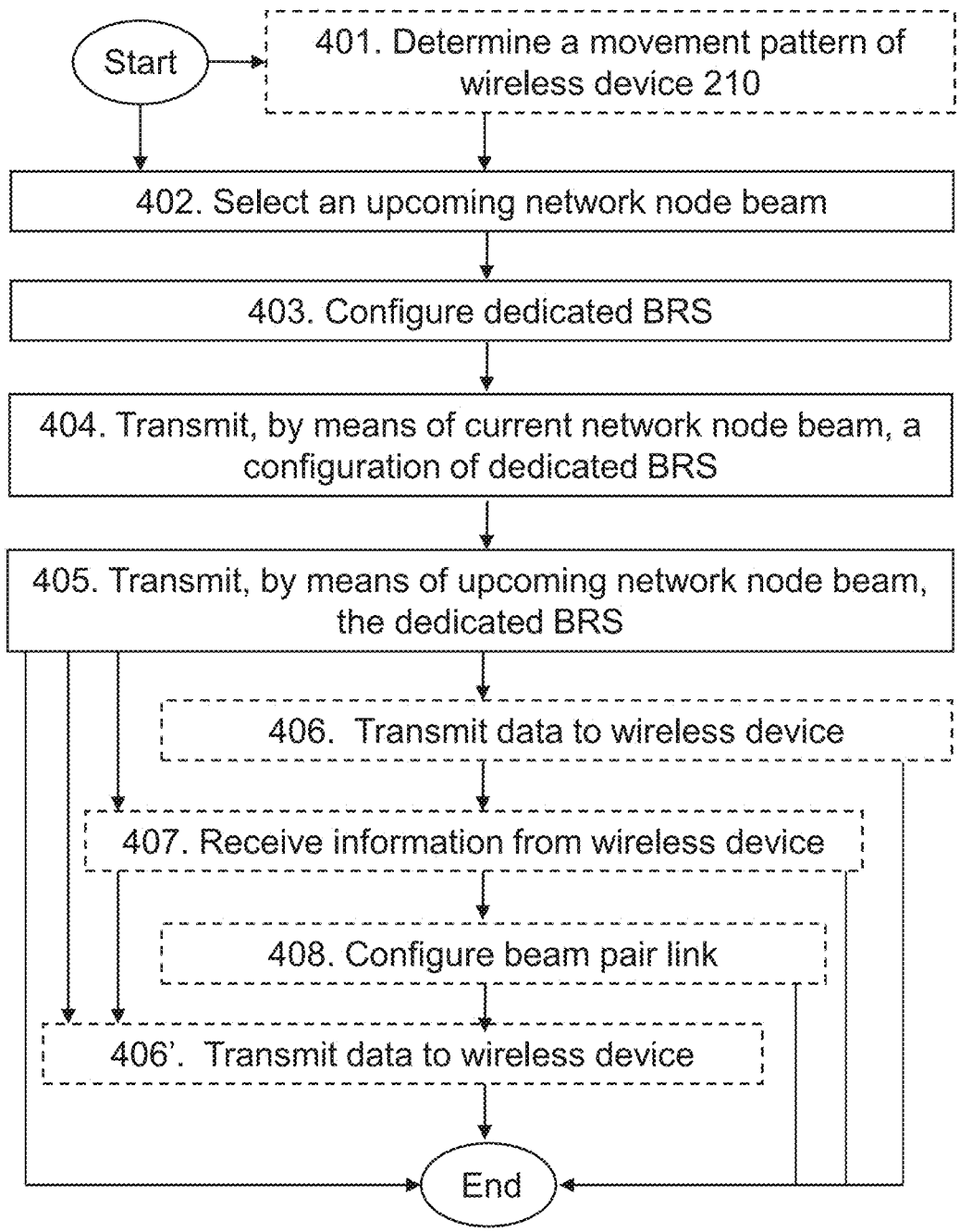
FIG. 4 is a flowchart schematically illustrating embodiments of a method performed by a network node.

Examples of methods performed by the network node 208 for beam selection will now be described with reference to flowchart depicted in FIG. 4. As previously mentioned, the network node 208 and the wireless device 210 are operating in the wireless communications network 200, and the wireless device 210 is served by the network node 208 using a current network node beam.

The methods comprise one or more of the following actions. Thus one or more of the actions may be optional. It should be understood that the actions may be taken in any suitable order and that some actions may be combined.

Action 401

In some embodiments, the network node 208 determines a movement pattern of the wireless device 210. For example, the network node 208 may determine the movement pattern by performing one or more out of: determining a sequence of one or more positions of the wireless device 210 by performing measurements of signal quality on signals received from the wireless device 210; and determining a sequence of one or more positions of the wireless device 210 by receiving, from the wireless device 210, results of measurements of signal quality on signals transmitted by the network node 208.

As will be described in Action 402, the determined movement pattern may be used when selecting the upcoming network node beam, since the network node 208 may select the upcoming network node beam based on the determined movement pattern of the wireless device 210 in relation to the one or more movement patterns comprised in the historic data. For example, when the wireless device 210 is moving in correspondence with one of the historic movement patterns, the network node 208 may select the upcoming network node beam in correspondence with the network node beams used for the historic movement pattern.

In some embodiments, the determined movement pattern of the wireless device 210 comprises information not only relating to a direction of the movement, but also to a velocity of the movement. Thus, the velocity with which the wireless device 210 is moving may be taken into account when for example determining the upcoming network node beam and when the ability of the current network node beam is predicted to be lost.

Action 402

As previously mentioned, when an upcoming ability to serve the wireless device 210 using the current network node beam is predicted to be lost based on historic data relating to at least one signal quality of one or more candidate network node beams at one or more positions located within coverage of the wireless communications network 200 and relating to one or more movement patterns of one or more wireless devices operating within coverage of the wireless communications network 200, the network node 208 selects upcoming network node beam out of the one or more candidate network node beams that are able to serve the wireless device 210 when the network node 208 has lost ability to serve the wireless device 210 using the current network node beam.

As described above, the determined movement pattern in Action 401 may be used when selecting the upcoming network node beam, since the selection of the upcoming network node beam may be based on the determined movement pattern of the wireless device 210 in relation to the one or more movement patterns comprised in the historic data.

In some embodiments, the network node 208 selects the upcoming network node beam further based on one or more processing resources of the network node 208. The one or more processing resources may be or relate to antenna panels, analog and/or digital circuitry, and/or software units used for the upcoming network node beam.

This relates to Action 301 previously described.

Action 403

The network node 208 configures a dedicated BRS for the upcoming network node beam, which upcoming network node beam is to be detected in beam selection by the wireless device 210 when the network node 208 loses ability to serve the wireless device 210 using the current network node beam.

This relates to Action 302 previously described.

Action 404

The network node 208 transmits, by means of the current network node beam, a configuration of the dedicated BRS to the wireless device 210.

This relates to Action 303 previously described.

Action 405

The network node 208 transmits, by means of the upcoming network node beam, the dedicated BRS to the wireless device 210.

This relates to Action 306 previously described.

Action 406, 406'

In some embodiments, the network node 208 transmits, using the upcoming network node beam, data to the wireless device 210. The network node 208 may transmit data using the upcoming network node beam preceding a configuration of a BPL comprising the upcoming network node beam or succeeding the configuration of the BPL.

Thus, the network node 208 may start to use the upcoming network node beam for data transmission to the wireless device 210 preceding or succeeding the configuration of the BPL. The data may be any kind of data used in communication with the wireless device 210.

For example, in Action 406 the network node 208 may transmit data using the upcoming network node beam preceding the configuration of the BPL comprising the upcoming network node beam, and in Action 406' the network node 208 may transmit data using the upcoming network node beam succeeding the configuration of the BPL comprising the upcoming network node beam.

Action 407

In some embodiments, the network node 208 receives information about a selected upcoming wireless device beam from the wireless device 210. The network node 208 may receive information about the upcoming wireless device beam(s) and the corresponding network beam(s) from the wireless device 210.

Further, the network node 208 may receive, from the wireless device 210, information about one or more processing resources of the wireless device 210 that are used in the selected upcoming wireless device beam.

The one or more processing resources may be or relate to antenna panels, analog and/or digital circuitry, and/or software units used for the selected upcoming wireless device beam.

Action 408

In some embodiments, the network node 208 configures a BPL comprising the upcoming network node beam and the selected upcoming wireless device beam. The network node 208 may configure the BPL based on the received information about the one or more processing resources of the wireless device 210.

Further, the network node 208 may configure the BPL comprising the upcoming network node beam and the selected upcoming wireless device beam based on information about the selected upcoming wireless device beam and a result of a measurement performed by the wireless device 210 on a signal quality of the dedicated beam reference signal.

Alternatively and in order to quickly configure the BPL, the network node 208 may configure the BPL comprising the upcoming network node beam and the selected upcoming wireless device beam, based on information about the selected upcoming wireless device beam and a message received from the wireless device 210 acknowledging reception of the dedicated beam reference signal and/or a message received from the wireless device 210 acknowledging reception of transmitted data. This alternative being quicker since the network node 208 does not have to await any measurement results from the wireless device 210.

Figure 5:
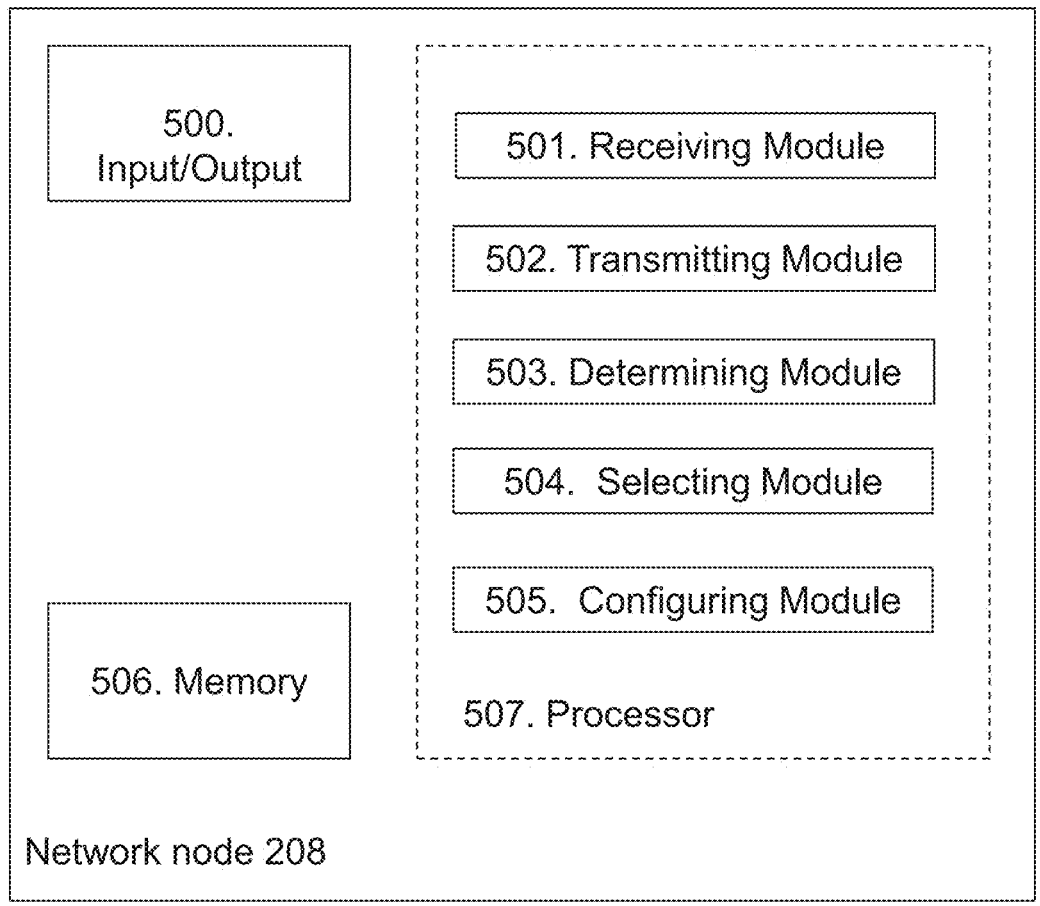
FIG. 5 is a block diagram schematically illustrating embodiments of a network node.

To perform the method for beam selection, the network node 208 may comprise an arrangement depicted in FIG. 5. As previously mentioned, the network node 208 and the wireless device 210 are configured to operate in the wireless communications network 200 and the wireless device 210 is configured to be served by the network node 208 using a current network node beam.

In some embodiments, the network node 208 via an input and output interface 500 is configured to communicate with one or more the wireless devices, e.g. the wireless devices 210, and one or more other network nodes, e.g. the core network node 204 or a RNN (not shown). The input and output interface 500 may comprise a wireless receiver (not shown) and a wireless transmitter (not shown).

The network node 208 is configured to receive, e.g. by means of a receiving module 501 configured to receive, transmissions from the core network node 204 or from the wireless device 210. The receiving module 501 may be implemented by or arranged in communication with a processor 507 of the network node 208. The processor 507 will be described in more detail below.

In some embodiments, the network node 208 is configured to receive information about one or more processing resources of the wireless device 210 that are used in the selected upcoming wireless device beam.

The network node 208 is configured to transmit, e.g. by means of a transmitting module 502 configured to transmit, transmissions to the wireless device 210. The transmitting module 502 may be implemented by or arranged in communication with the processor 507 of the network node 208.

The network node 208 is configured to transmit, by means of the current network node beam, a configuration of the dedicated beam reference signal to the wireless device 210.

Further, the network node 208 is configured to transmit, by means of an upcoming network node beam, the dedicated beam reference signal to the wireless device 210.

The network node 208 may be configured to transmit, by means of the upcoming network node beam, data to the wireless device 210. For example, the network node 208 may be configured to transmit data by one out of: transmitting data preceding a configuration of a beam pair link comprising the upcoming network node beam and a selected upcoming wireless device beam, and transmitting data succeeding a configuration of the beam pair link.

The network node 208 is configured to determine, e.g. by means of a determining module 503 configured to determine, a movement pattern. The determining module 503 may be implemented by or arranged in communication with the processor 507 of the network node 208.

In some embodiments, the network node 208 is configured to determine a movement pattern of the wireless device 210. For example, the network node 208 may be configured to determine the movement pattern by being configured to perform one or more out of:

determine a sequence of one or more positions of the wireless device 210 by performing measurements of signal quality on signals received from the wireless device 210; and determine a sequence of one or more positions of the wireless device 210 by receiving, from the wireless device 210, results of measurements of signal quality on signals transmitted by the network node 208.

The network node 208 may be configured to select, e.g. by means of a selecting module 504 configured to select, an upcoming network node beam. The selecting module 504 may be implemented by or arranged in communication with the processor 507 of the network node 208.

The network node 208 is configured to select the upcoming network node beam when an upcoming ability to serve the wireless device 210 using the current network node beam is predicted to be lost based on historic data. For example, the network node 208 is configured to select the upcoming network node beam out of the one or more candidate network node beams that are able to serve the wireless device 210 when the network node 208 has lost ability to serve the wireless device 210 using the current network node beam.

As previously mentioned, the historic data relate to at least one signal quality of one or more candidate network node beams at one or more positions located within coverage of the wireless communications network 200 and relating to one or more movement patterns of one or more wireless devices operating within coverage of the wireless communications network 200.

In some embodiments, the network node 208 is configured to select the upcoming network node beam further based on one or more processing resources of the network node 208. As previously mentioned, the one or more processing resources may be or relate to antenna panels, analog and/or digital circuitry, and/or software units used for the network node 208.

In some embodiments wherein the network node 208 has determined a movement pattern of the wireless device, the network node 208 may be configured to select the upcoming network node beam further based on the determined movement pattern of the wireless device 210 in relation to the one or more movement patterns comprised in the historic data.

The network node 208 may be configured to configure, e.g. by a configuring modules 505 configured to configure, a dedicated beam reference signal for the upcoming network node beam. The configuring module 505 may be implemented by or arranged in communication with the processor 507 of the network node 208.

The network node beam is to be detected in beam selection by the wireless device 210 when the network node 208 loses ability to serve the wireless device 210 using the current network node beam.

In some embodiments, the network node 208 is configured to configure the beam pair link comprising the upcoming network node beam and the selected upcoming wireless device beam based on information about the selected upcoming wireless device beam and on at least one out of: a result of a measurement performed by the wireless device 210 on a signal quality of the dedicated beam reference signal, a message received from the wireless device 210 acknowledging reception of the dedicated beam reference signal, and a message received from the wireless device 210 acknowledging reception of transmitted data.

In some embodiments wherein the network node 208 is configured to receive information about one or more processing resources of the wireless device 210 that are used in the selected upcoming wireless device beam, the network node 208 is further configured to configure the beam pair link based on the received information about the one or more processing resources of the wireless device 210.

The network node 208 may also comprise means for storing data. In some embodiments, the network node 208 comprises a memory 506 configured to store the data. The data may be processed or non-processed data and/or information relating thereto. The memory 506 may comprise one or more memory units. Further, the memory 506 may be a computer data storage or a semiconductor memory such as a computer memory, a read-only memory, a volatile memory or a non-volatile memory. The memory is arranged to be used to store obtained information, data, configurations, scheduling decisions, and applications, etc. to perform the methods herein when being executed in the network node 208.

Embodiments herein for beam selection may be implemented through one or more processors, such as the processor 507 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the network node 208. One such carrier may be in the form of an electronic signal, an optical signal, a radio signal or a computer-readable storage medium. The computer-readable storage medium may be a CD ROM disc or a memory stick.

The computer program code may furthermore be provided as program code stored on a server and downloaded to the network node 208.

Those skilled in the art will also appreciate that the input/output interface 500, the receiving module 501, the transmitting module 502, the determining module 503, and the selecting module 504, and the configuring module 505 above may refer to a combination of analog and digital circuits, and/or one or more processors configured with software and/or firmware, e.g. stored in the memory 506, that when executed by the one or more processors such as the processors in the network node 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 6:
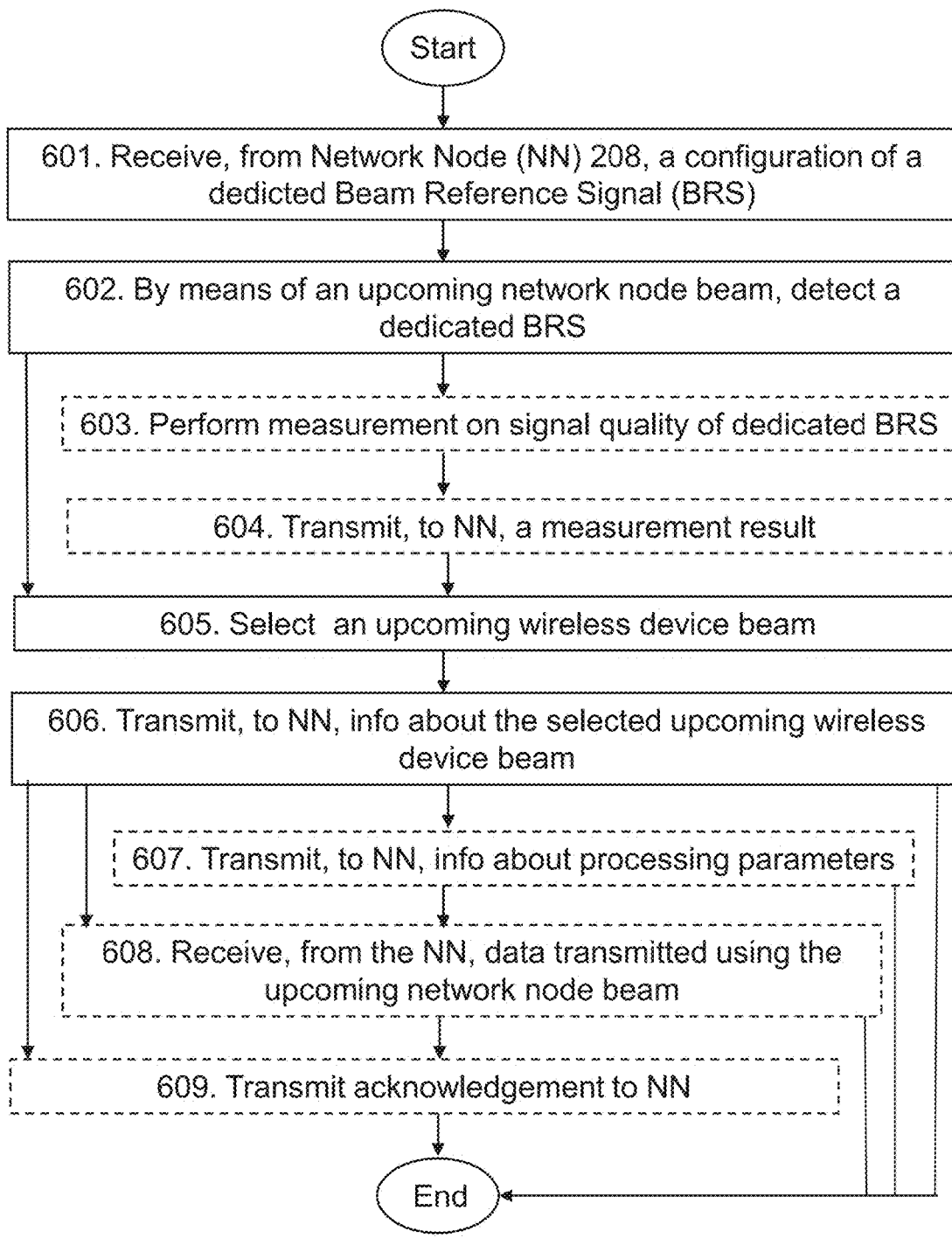
FIG. 6 is a flowchart schematically illustrating embodiments of a method performed by a wireless device.

Examples of methods performed by the wireless device 210 for beam selection, will now be described with reference to flowchart depicted in FIG. 6. As previously described, the network node 208 and the wireless device 210 are configured to operate in the wireless communications network 200 and the wireless device 210 is served by the network node 208 using the current network node beam.

The methods comprise one or more of the following actions. Thus, one or more of the actions may be optional. It should be understood that the actions may be taken in any suitable order and that some actions may be combined.

Action 601

The wireless device 210 receives, by means of the current network node beam, a configuration of a dedicated beam reference signal from the network node 208.

This relates to Actions 303 and 404 previously described.

Action 602

The wireless device 210 detects, by means of an upcoming network node beam, the dedicated beam reference signal. As previously mentioned, the upcoming network node beam is one network node beam out of one or more candidate network node beams that are able to serve the wireless device 210 when the network node 208 has lost ability to serve the wireless device 210 using the current network node beam.

This relates to Actions 305 and 405 previously described.

Action 603

In some embodiments, the wireless device 210 performs a measurement on a signal quality of the dedicated BRS.

Action 604

In some embodiments, wherein the wireless device 210 performs the measurement on the signal quality of the dedicated BRS, the wireless device 210 may transmit, to the network node 208, a result of the performed measurement.

Action 605

The wireless device 210 selects an upcoming wireless device beam based on a measurement of a signal quality of the received dedicated beam reference signal. It should be understood that the upcoming wireless device beam may be a current wireless device beam, e.g. a current receive beam for the wireless device 210, or a new wireless device beam, e.g. a new receive beam for the wireless device 210. Further, it should be understood that the wireless device 210 may select a plurality of upcoming wireless device beams. For example, a wireless device capable of dual connectivity may select two upcoming wireless device beams.

In some embodiments, the wireless device 210 selects the upcoming wireless device beam by selecting one or several upcoming receive beams based on a signal quality measured when detecting the dedicated reference signal transmitted on the upcoming network node beam. Depending on which network node beam that is chosen different upcoming wireless device beams, e.g. different receiving beams for the wireless device 210, may be best. To find the optimal upcoming wireless device beam, the wireless device 210 may need to perform an exhaustive search of all combinations of beam pairs. This may be further complicated by the fact that some wireless devices, e.g. wireless devices with analog beam forming capabilities only, may only be able to try a very limited number of wireless device beams during each network node beam transmission. Hence, it takes time before all possibilities are covered.

This relates to Action 306 previously described.

Action 606

The wireless device 210 transmits, to the network node 208, information about the selected upcoming wireless device beam. The information may be transmitted using a current wireless device beam, e.g. a current transmit beam for the wireless device 210, and/or using an upcoming wireless device beam, e.g. an upcoming transmit beam for the wireless device 210. The wireless device 210 may transmit the information on both the current wireless device beam and the upcoming wireless device beam when being unsure about whether or not a current BPL comprising the current wireless device beam is available or has been lost.

This relates to Action 307 previously described.

Action 607

In some embodiments, the wireless device 210 transmit, to the network node 208, information about one or more processing resources of the wireless device 210 that are used in the selected upcoming wireless device beam.

Action 608

In some embodiments, the wireless device 210 receives, from the network node 208, data transmitted using the upcoming network node beam. The wireless device 210 may receive data preceding a configuration of a beam pair link comprising the upcoming network node beam and the selected upcoming wireless device beam, or receive data succeeding the configuration of the beam pair link.

Action 608

In some embodiments, the wireless device 210 transmits, to the network node 208, a message acknowledging reception of the dedicated beam reference signal, and/or a message acknowledging reception of transmitted data.

To perform the method for beam selection, the wireless device 210 may comprise an arrangement depicted in FIG. 7. As previously mentioned, the network node 208 and the wireless device 210 are operating in the wireless communications network 200 and the wireless device 210 is served by the network node 208 using the current network node beam.

In some embodiments, the wireless device 210 comprises an input and output interface 700 configured to communicate with one or more the communications devices, and one or more other network nodes, e.g. the core network node 204, the RNN 208 or a neighbour RNN (not shown). The input and output interface 700 may comprise a wireless receiver (not shown) and a wireless transmitter (not shown).

The wireless device 210 is configured to receive, e.g. by means of a receiving module 701 configured to receive, transmissions from the network node 208. The receiving module 701 may be implemented by or arranged in communication with a processor 707 of the wireless device 210. The processor 707 will be described in more detail below.

The wireless device 210 is configured to, by means of the current network node beam, receive a configuration of a dedicated beam reference signal from the network node 208.

In some embodiments, the wireless device 210 is configured to receive, from the network node 208, data transmitted using the upcoming network node beam. For example, the wireless device 210 may be configured to receive data by one out of: receiving data preceding a configuration of a beam pair link comprising the upcoming network node beam and the selected upcoming wireless device beam, and receiving data succeeding a configuration of the beam pair link.

The wireless device 210 is configured to transmit, e.g. by means of a transmitting module 702 configured to transmit, transmissions, e.g. data or information, to the network node 208. The transmitting module 702 may be implemented by or arranged in communication with the processor 707 of the wireless device 210.

The wireless device 210 is configured to transmit, to the network node 208, information about a selected upcoming wireless device beam.

In some embodiments, wherein the wireless device 210 is configured to perform a measurement on a signal quality of the dedicated beam reference signal, the wireless device 210 may be configured to transmit, to the network node 208, a result of the performed measurement.

The wireless device 210 may be configured to transmit, to the network node 208, a message acknowledging reception of the dedicated beam reference signal, and/or a message acknowledging reception of transmitted data.

Further, the wireless device 210 may be configured to transmit information about one or more processing resources of the wireless device 210 that are used in the selected upcoming wireless device beam.

The wireless device 210 is configured to detect, e.g. by means of a detecting module 703 configured to detect, a reference signal, e.g. a dedicated BRS. The detecting module 703 may be implemented by or arranged in communication with the processor 707 of the wireless device 210.

The wireless device 210 is configured to, by means of an upcoming network node beam, detect the dedicated BRS. The upcoming network node beam may be one network node beam out of one or more candidate network node beams that are able to serve the wireless device 210 when the network node 208 has lost ability to serve the wireless device 210 using the current network node beam.

The wireless device 210 may be configured to perform, e.g. by means of a performing module 704 configured to perform, a measurement on a signal. The performing module 704 may be implemented by or arranged in communication with the processor 707 of the wireless device 210.

In some embodiments, the wireless device 210 is configured to perform a measurement on a signal quality of the dedicated beam reference signal.

The wireless device 210 may be configured to select, e.g. by means of a selecting module 705 configured to select, an upcoming wireless device beam. The selecting module 705 may be implemented by or arranged in communication with the processor 707 of the wireless device 210.

The wireless device 210 is configured to select an upcoming wireless device beam based on a measurement of a signal quality of the received dedicated beam reference signal.

In some embodiments, the wireless device 210 is configured to select the upcoming wireless device beam by further being configured to select one or several upcoming receive beams based on a signal quality measured when detecting the dedicated reference signal transmitted on the upcoming network node beam.

The wireless device 210 may also comprise means for storing data. In some embodiments, the wireless device 210 comprises a memory 706 configured to store the data. The data may be processed or non-processed data and/or information relating thereto. The memory 706 may comprise one or more memory units. Further, the memory 706 may be a computer data storage or a semiconductor memory such as a computer memory, a read-only memory, a volatile memory or a non-volatile memory. The memory is arranged to be used to store obtained information, data, configurations, scheduling decisions, and applications, etc. to perform the methods herein when being executed in the wireless device 210.

Embodiments herein for beam selection may be implemented through one or more processors, such as the processor 707 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the wireless device 208. One such carrier may be in the form of an electronic signal, an optical signal, a radio signal or a computer-readable storage medium. The computer-readable storage medium may be a CD ROM disc or a memory stick.

The computer program code may furthermore be provided as program code stored on a server and downloaded to the wireless device 210.

Those skilled in the art will also appreciate that the input/output interface 700, the receiving module 701, the transmitting module 702, the detecting module 703, the performing module 704, and the selecting module 705 above may refer to a combination of analog and digital circuits, and/or one or more processors configured with software and/or firmware, e.g. stored in the memory 706, that when executed by the one or more processors such as the processors in the wireless device 210 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

EXAMPLE

By letting the communications network 200, e.g. the network node 208, assist the wireless device 210 in beam selection, the work of the wireless device 210 when detecting a new network beam, signalling this measurement to the communications network 200, and configuring a new BPL, is moved from when the wireless device 210 detects the new network beam to before it is detected, and by that the time until data may be sent on the new BPL is shortened and the risk for lost connections is reduced.

The action to take may depend on, for example, the speed with which an existing BPL is deteriorating and the number of possible new beam candidates.

By informing the wireless device 210 of a limited group of network node beams that soon will be good, the wireless device 210 may focus the measurements on these beams, and save resources by not measuring on network node beams that do not cover the area.

Further, by informing the wireless device 210 to start measuring on a set of dedicated BRS, detection of the new network node beam and a matching wireless device beam will be faster.

Furthermore, by letting the communications network 200, e.g. by means of the network node 208, configure a new BPL based on previous measurements possibly using machine-learning techniques, the wireless device 210 does not need to detect and report a new network node beam to the network node 208 prior to the BPL configuration. The work of finding a best wireless device beam may be facilitated by letting the communications network 200, e.g. the network node 208, also start sending more frequent dedicated BRSs.

In case of the wireless device 210 having processing resources to handle more than one BPL, such as a plurality of antenna panels, the processing resources historically used with the upcoming network node beam may be part of the network-assisted BPL configuration to facilitate the wireless device beam tracking.

FIG. 8 schematically illustrates an example radio environment outside and inside a tunnel 801. One scenario with fast changing radio environment is when a wireless device 210 is traveling inside a tunnel. In the example illustrated in FIG. 8, the network node beam A covers a first opening, the network node beam B covers the inside of the tunnel and the network node beam C covers a second opening. In the illustrated example, a first network node 208-1 provides the network node beams A and B, and a second network node 208-2 provides the network node beam C. If the wireless device 210 is first served by the network node beam A and then by the network node beam B, the communications network 200, e.g. by means of the first network node 208-1, may assist the wireless device 210 to start measuring on the network node beam C before the wireless device 210 has detected the network node beam C. If the wireless device 210 moves in the opposite direction, the wireless device 210 is served first by the network node beam C, then by the network node beam B, and the communications network 200, e.g. by means of the second network node 208-2, may assist the wireless device 210 to start measuring on the network node beam B. The communications network 200, e.g. by means of the network node 208 serving the wireless device 210, shall initiate the wireless device configuration so that the wireless device 210 is able to start to measuring on the upcoming network node beam before the current network node beam has lost coverage. Further, when going from C to B, the second network node 208-2 may send the configuration on the current network node beam C, and the first network node 208-1 starts sending reference symbols on the upcoming network node beam B. Some embodiments disclosed herein comprise signalling between the first and second network nodes 208-1, 208-2. It should be understood that there may be a need to assist the wireless device 210 also between A and B, and between B and A.

The wireless device 210 shall be configured to measure on the upcoming network node beam before the current network node beam has lost coverage. Starting the measuring on the new network node beam too early means waste of resources and too late means increased risk for lost call.

Using a threshold for signal strength of network node beam B to know when to start measuring on network node beam C might not be sufficient since the signal strength may not be accurate enough. A better way may therefore be to have an idea of position and speed of the wireless device 210 in order to be able to start measuring just before it is time to switch network node beam.

This may be achieved by recording RSRP values from many wireless devices traveling the same trajectory, and over time get a measurement series with detailed resolution. The upper diagram in FIG. 8 schematically illustrates RSRP values for the respective network node beams A, B, C. The absolute RSRP values may vary due to for example wireless device brand and shielding, but the relative signal strengths will be similar. Wireless devices traveling at different speeds would have different distances between measurements, but may possibly also be fitted in to the wireless device-common measurement series of the distance measurements, e.g. the distance of the tunnel 801 in FIG. 8.

The wireless device-common measurement series may be stored in a data base arranged in communication with the network node 208 or comprised in the network node 208, but may alternatively also be sent down to the wireless devices with a trigger point to inform the communications network 200, e.g. the network node 208, when the wireless device 210 has reached a predefined position at which predefined position configuration of a new network node beam shall start.

The RSRP signature may also be used to identify that the wireless device 210 is not moving. For example, that may be the case if there is a queue in the tunnel 801.

A second scenario is a shopping mall, wherein entrances may have the same characteristics as the openings in the tunnel with fast-changing signal strengths.

A third scenario is in a dense city where narrow and high buildings limit beam coverage. When making sharp turns in such environments, the radio characteristics will change quickly and embodiments of network-assisted beam measurement disclosed herein may be applied.

| ABBREVIATIONS | |
|---|---|
| Abbreviation | Explanation |
| 5G | Fifth-Generation Mobile Radio Access |
| AGC | Automatic Gain Control |
| BPL | Beam-Pair Link |
| BRRS | Beam-Refinement Reference Signal |
| BRS | Beam-Reference Signal |
| CE | Control Element |
| CSI-RS | Channel-State Information Reference Signal |
| LTE | Long-Term Evolution |
| MAC | Medium-Access Control |
| NR | New Radio |
| Rx | Receiver |
| SRS | Sounding Reference Signal |
| TTI | Transmission Time Interval |
| Tx | Transmitter |
| UE | User Equipment |

When using the word "comprise" or "comprising" it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a network node for beam selection, wherein the network node and a wireless device are operating in a wireless communications network, wherein the wireless device is served by the network node using a current network node beam, and wherein the method comprises:
   selecting an upcoming network node beam when an upcoming ability to serve the wireless device using the current network node beam is predicted to be lost based on historic data relating to at least one signal quality of one or more candidate network node beams at one or more positions located within coverage of the wireless communications network and relating to one or more movement patterns of one or more wireless devices operating within coverage of the wireless communications network, wherein the upcoming network node beam is selected from the one or more candidate network node beams that are able to serve the wireless device when the network node has lost ability to serve the wireless device using the current network node beam;
   configuring a dedicated beam reference signal for the upcoming network node beam, which upcoming network node beam is to be detected in beam selection by the wireless device when the network node loses ability to serve the wireless device using the current network node beam;
   transmitting, to the wireless device via the current network node beam, a configuration of the dedicated beam reference signal; and
   transmitting, to the wireless device via the upcoming network node beam, the dedicated beam reference signal.

2. The method of claim 1, comprising transmitting data, to the wireless device via the upcoming network node beam, according to one of:
   preceding a configuration of a beam pair link comprising the upcoming network node beam and a selected upcoming wireless device beam, and
   succeeding a configuration of the beam pair link.

3. The method of claim 2, comprising:
   configuring the beam pair link comprising the upcoming network node beam and the selected upcoming wireless device beam based on information about the selected upcoming wireless device beam and on at least one out of: a result of a measurement performed by the wireless device on a signal quality of the dedicated beam reference signal, a message received from the wireless device acknowledging reception of the dedicated beam reference signal, and a message received from the wireless device acknowledging reception of transmitted data.

4. The method of claim 3, comprising:
   receiving information about one or more processing resources of the wireless device that are used in the selected upcoming wireless device beam; and
   configuring of the beam pair link further based on the received information about the one or more processing resources of the wireless device.

5. The method of claim 1, wherein the selecting of the upcoming network node beam is further based on one or more processing resources of the network node.

6. The method of claim 1, comprising:
   determining a movement pattern of the wireless device, by performing one or more of:
      determining a sequence of one or more positions of the wireless device by performing measurements of signal quality on signals received from to the wireless device; and
      determining a sequence of one or more positions of the wireless device by receiving, from the wireless device, results of measurements of signal quality on signals transmitted by the network node; and
   wherein selecting the upcoming network node beam is further based on the determined movement pattern of the wireless device in relation to the one or more movement patterns comprising the historic data.

7. A method performed by a wireless device for beam selection, wherein the wireless device and a network node are operating in a wireless communications network, wherein the wireless device is served by the network node using a current network node beam, and wherein the method comprises:
   receiving, from the network node via the current network node beam, a configuration of a dedicated beam reference signal;
   detecting the dedicated beam reference signal via an upcoming network node beam that is one of one or more candidate network node beams that are able to serve the wireless device when the network node has lost ability to serve the wireless device using the current network node beam;

based on a measurement of a signal quality of the dedicated beam reference signal, selecting an upcoming wireless device beam suitable for use in a beam pair link (BPL) together with the upcoming network node beam; and transmitting, to the network node, information about the selected upcoming wireless device beam.

8. The method of claim 7, wherein the selecting of the upcoming wireless device beam further comprises selecting one or several upcoming receive beams based on a signal quality measured when detecting the dedicated reference signal transmitted on the upcoming network node beam.

9. The method of claim 7, comprising receiving data, transmitted from the network node using the upcoming network node beam, according to one of:
preceding a configuration of a beam pair link comprising the upcoming network node beam and the selected upcoming wireless device beam; and
succeeding a configuration of the beam pair link.

10. The method of claim 7, comprising:
performing a measurement on a signal quality of the dedicated beam reference signal; and
transmitting, to the network node, a result of the performed measurement.

11. The method of claim 7, comprising transmitting, to the network node, a message acknowledging reception of the dedicated beam reference signal, and/or a message acknowledging reception of transmitted data.

12. The method of claim 7, comprising transmitting, to the network node, information about one or more processing resources of the wireless device that are used in the selected upcoming wireless device beam.

13. A non-transitory, computer-readable medium comprising executable instructions which, when executed on at least one processor, configure the at least one processor to carry out the method according to claim 1.

14. A network node for beam selection, wherein the network node and a wireless device are configured to operate in a wireless communications network, wherein the wireless device is configured to be served by the network node using a current network node beam, wherein the network node comprises:
a processor; and
a memory storing executable instructions that, when executed by the processor, configure the network node to:
select an upcoming network node beam when an upcoming ability to serve the wireless device using the current network node beam is predicted to be lost based on historic data relating to at least one signal quality of one or more candidate network node beams at one or more positions located within coverage of the wireless communications network and relating to one or more movement patterns of one or more wireless devices operating within coverage of the wireless communications network, wherein the network node is operative to select the upcoming network node beam out of the one or more candidate network node beams that are able to serve the wireless device when the network node has lost ability to serve the wireless device using the current network node beam;
configure a dedicated beam reference signal for the upcoming network node beam, which upcoming network node beam is to be detected in beam selection by the wireless device when the network node loses ability to serve the wireless device using the current network node beam;
transmit, to the wireless device via the current network node beam, a configuration of the dedicated beam reference signal; and
transmit, to the wireless device via the upcoming network node beam, the dedicated beam reference signal.

15. The network node of claim 14, wherein execution of the instructions further configure the network node to transmit data, to the wireless device via the upcoming network node beam, according to one of:
preceding a configuration of a beam pair link comprising the upcoming network node beam and a selected upcoming wireless device beam, and
succeeding a configuration of the beam pair link.

16. The network node of claim 15, wherein execution of the instructions further configure the network node to:
configure the beam pair link comprising the upcoming network node beam and the selected upcoming wireless device beam based on information about the selected upcoming wireless device beam and on at least one out of: a result of a measurement performed by the wireless device on a signal quality of the dedicated beam reference signal, a message received from the wireless device acknowledging reception of the dedicated beam reference signal, and a message received from the wireless device acknowledging reception of transmitted data.

17. The network node of claim 16, wherein execution of the instructions further configure the network node to:
receive information about one or more processing resources of the wireless device that are used in the selected upcoming wireless device beam; and
configure the beam pair link further based on the received information about the one or more processing resources of the wireless device.

18. The network node of claim 14, wherein execution of the instructions configure the network node to determine the upcoming network node beam further based on one or more processing resources of the network node.

19. The network node of claim 14, wherein execution of the instructions further configure the network node to:
determine a movement pattern of the wireless device, by being operative to perform one or more out of:
determine a sequence of one or more positions of the wireless device by performing measurements of signal quality on signals received from to the wireless device; and
determine a sequence of one or more positions of the wireless device by receiving, from the wireless device, results of measurements of signal quality on signals transmitted by the network node; and
select the upcoming network node beam further based on the determined movement pattern of the wireless device in relation to the one or more movement patterns comprising the historic data.

20. A wireless device for beam selection, wherein the wireless device and a network node are configured to operate in a wireless communications network, wherein the wireless device is configured to be served by the network node using a current network node beam, wherein the wireless device comprises:

a processor; and a memory storing executable instructions that, when executed by the processor, configure the wireless device to:

receive, from the network node via the current network node beam, a configuration of a dedicated beam reference signal;

detect the dedicated beam reference signal via an upcoming network node beam that is one of one or more candidate network node beams that are able to serve the wireless device when the network node has lost ability to serve the wireless device using the current network node beam;

based on a measurement of a signal quality of the dedicated beam reference signal, select an upcoming wireless device beam suitable for use in a beam pair link (BPL) together with the upcoming network node beam; and transmit, to the network node, information about the selected upcoming wireless device beam.

21. The wireless device of claim 20, wherein execution of the instructions further configure the wireless device to select the upcoming wireless device beam by selecting one or more upcoming receive beams based on a signal quality measured when detecting the dedicated reference signal transmitted on the upcoming network node beam.

22. The wireless device of claim 20, wherein execution of the instructions further configure the wireless device to receive data, transmitted from the network node using the upcoming network node beam, according to one of:

preceding a configuration of a beam pair link comprising the upcoming network node beam and the selected upcoming wireless device beam, and succeeding a configuration of the beam pair link.

23. The wireless device of claim 20, wherein execution of the instructions further configure the network node to:

perform a measurement on a signal quality of the dedicated beam reference signal; and transmit, to the network node, a result of the performed measurement.

24. The wireless device of claim 20, wherein execution of the instructions further configure the wireless device to:

transmit, to the network node, a message acknowledging reception of the dedicated beam reference signal, and/or a message acknowledging reception of transmitted data.

25. The wireless device of claim 20, wherein execution of the instructions further configure the wireless device to transmit information about one or more processing resources of the wireless device that are used in the selected upcoming wireless device beam.

* * * * *